US011287854B2

(12) United States Patent
Morino et al.

(10) Patent No.: US 11,287,854 B2
(45) Date of Patent: Mar. 29, 2022

(54) PORTABLE INFORMATION APPARATUS

(71) Applicant: LENOVO (SINGAPORE) PTE. LTD., Singapore (SG)

(72) Inventors: Takayuki Morino, Kanagawa (JP); Satoshi Seino, Kanagawa (JP); Masayuki Amano, Kanagawa (JP); Seita Horikoshi, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 103 days.

(21) Appl. No.: 16/938,618

(22) Filed: Jul. 24, 2020

(65) Prior Publication Data
US 2021/0026417 A1 Jan. 28, 2021

(30) Foreign Application Priority Data
Jul. 24, 2019 (JP) .............................. JP2019-136097

(51) Int. Cl.
*G06F 1/16* (2006.01)
*E05D 7/00* (2006.01)
*E05D 11/08* (2006.01)

(52) U.S. Cl.
CPC ............. *G06F 1/1681* (2013.01); *E05D 7/00* (2013.01); *E05D 11/08* (2013.01); *G06F 1/1652* (2013.01); *G06F 1/1683* (2013.01); *E05Y 2900/606* (2013.01)

(58) Field of Classification Search
CPC combination set(s) only.
See application file for complete search history.

(56) References Cited

U.S. PATENT DOCUMENTS

| 9,411,365 | B1 * | 8/2016 | Tanner | ...................... E05D 3/12 |
| 9,930,794 | B2 | 3/2018 | Luan et al. | |
| 10,180,701 | B2 * | 1/2019 | Nakamura | ............ G06F 1/1616 |
| 10,228,724 | B2 * | 3/2019 | Nakamura | ............ G06F 1/1681 |
| 10,234,907 | B2 * | 3/2019 | Knoppert | .............. G06F 1/1652 |
| 10,296,054 | B2 * | 5/2019 | Holung | ............... H04M 1/0268 |
| 10,345,858 | B2 * | 7/2019 | Han | ..................... G06F 1/1641 |
| 10,466,747 | B2 * | 11/2019 | Yun | ..................... H05K 5/0226 |

(Continued)

FOREIGN PATENT DOCUMENTS

| JP | 2014519626 A | 8/2014 |
| JP | 2018-112835 A | 7/2018 |

(Continued)

*Primary Examiner* — Lisa Lea-Edmonds
(74) *Attorney, Agent, or Firm* — Antony P. Ng; Russell Ng PLLC

(57) ABSTRACT

A portable information apparatus is provided. The portable information apparatus includes a first chassis, a second chassis and a hinge device. The hinge device includes a set of outer shell members disposed side-by-side along an arrangement direction of the first chassis and the second chassis and is respectively equipped with hollow parts, a set of inner shell members each of which is disposed so as to stride over a boundary at least between lower faces of the mutually adjacent outer shell members in the hollow parts of the mutually adjacent outer shell members, a first coupling section which couples each inner shell member and one of the mutually adjacent outer shell members together and a second coupling section which couples each inner shell member and the other of the mutually adjacent outer shell members together.

18 Claims, 16 Drawing Sheets

(56) References Cited

U.S. PATENT DOCUMENTS

| | | | |
|---|---|---|---|
| 11,079,807 B1* | 8/2021 | Robinson | E05D 11/0081 |
| 2015/0062840 A1* | 3/2015 | Kim | G06F 1/1626 |
| | | | 361/749 |
| 2016/0349802 A1* | 12/2016 | Ahn | G06F 1/1681 |
| 2017/0365197 A1* | 12/2017 | Kim | G09F 9/301 |
| 2019/0033920 A1* | 1/2019 | Yun | G06F 1/1652 |
| 2019/0132432 A1 | 5/2019 | Park et al. | |
| 2019/0196541 A1* | 6/2019 | O'Neil | H04M 1/0216 |
| 2021/0026417 A1* | 1/2021 | Morino | G06F 1/1683 |
| 2021/0343974 A1* | 11/2021 | Zhang | G06F 1/1652 |

FOREIGN PATENT DOCUMENTS

| | | |
|---|---|---|
| JP | 2018132129 A | 8/2018 |
| JP | 2019091004 A | 6/2019 |
| KR | 1020150037383 A | 4/2015 |

* cited by examiner

PORTABLE INFORMATION APPARATUS

PRIORITY CLAIM

The present application claims benefit of priority under 35 U.S.C. §§ 120, 365 to the previously filed Japanese Patent Application No. JP2019-136097 with a priority date of Jul. 24, 2019, which is incorporated by reference herein.

TECHNICAL FIELD

The present invention relates to potable information apparatuses in general, and in particular to a potable information apparatus having two chassis that are foldable via a hinge device.

BACKGROUND

Portable information apparatuses having a touch panel type liquid crystal display while without any physical keyboard, such as tablet-type PCs, smart phones, etc., are becoming popular. It is desirable that the portable information apparatus of this type be large when used and be small when not used. Accordingly, a portable information apparatus having two chassis that can be foldable by a hinge device is preferred.

For example, the chassis of the apparatus are mutually folded via the hinge devices that are disposed on both ends of a bending part between the chassis respectively. Incidentally, with this configuration, when mutually folding the chassis, a gap is left between the chassis and thus hinges and parts in the chassis are exposed to the outside through the gap. Accordingly, an installation of a spine member for hiding the gap is necessary, which complicates the design go and increases part costs.

Consequently, it would be desirable to provide an improved portable information apparatus having two chassis that are foldable via a hinge device.

SUMMARY

In accordance with an embodiment of the present disclosure, a portable information apparatus includes a first chassis having an upper face, a lower face and side faces, a second chassis having an upper face, a lower face and side faces, and a hinge device disposed between the mutually adjacent side faces of the first chassis and the second chassis for coupling the first chassis and the second chassis together to be foldable, in which the hinge device has a set of outer shell members disposed side-by-side along an arrangement direction of the first chassis and the second chassis and is respectively equipped with hollow parts that pass through the outer shell members in the arrangement direction, a set of inner shell members each of which is disposed so as to stride over a boundary at least between lower faces of the mutually adjacent outer shell members in the hollow parts of the mutually adjacent outer shell members, a first coupling section that couples each inner shell member and one of the mutually adjacent outer shell members together to be relatively rotatable and relatively movable and a second coupling section that couples each inner shell member and the other of the mutually adjacent outer shell members together to be relatively rotatable and relatively movable, and couples the first chassis and the second chassis together to be foldable in such a manner that each outer shell member and each inner shell member rotationally move relatively via the first coupling section and the second coupling section and thereby the upper faces of the first chassis and the second chassis mutually face.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
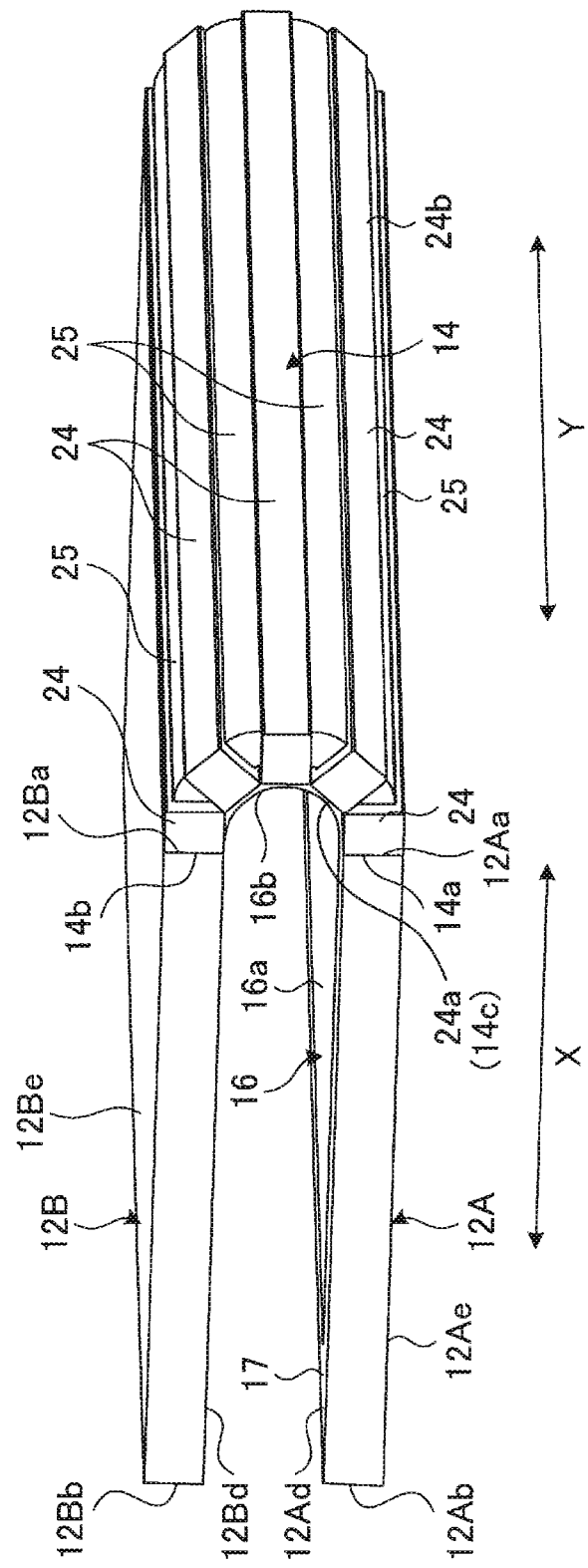
FIG. 1 is a perspective view illustrating a state where a portable information apparatus is closed to a housed form, according to one embodiment.
Figure 2:
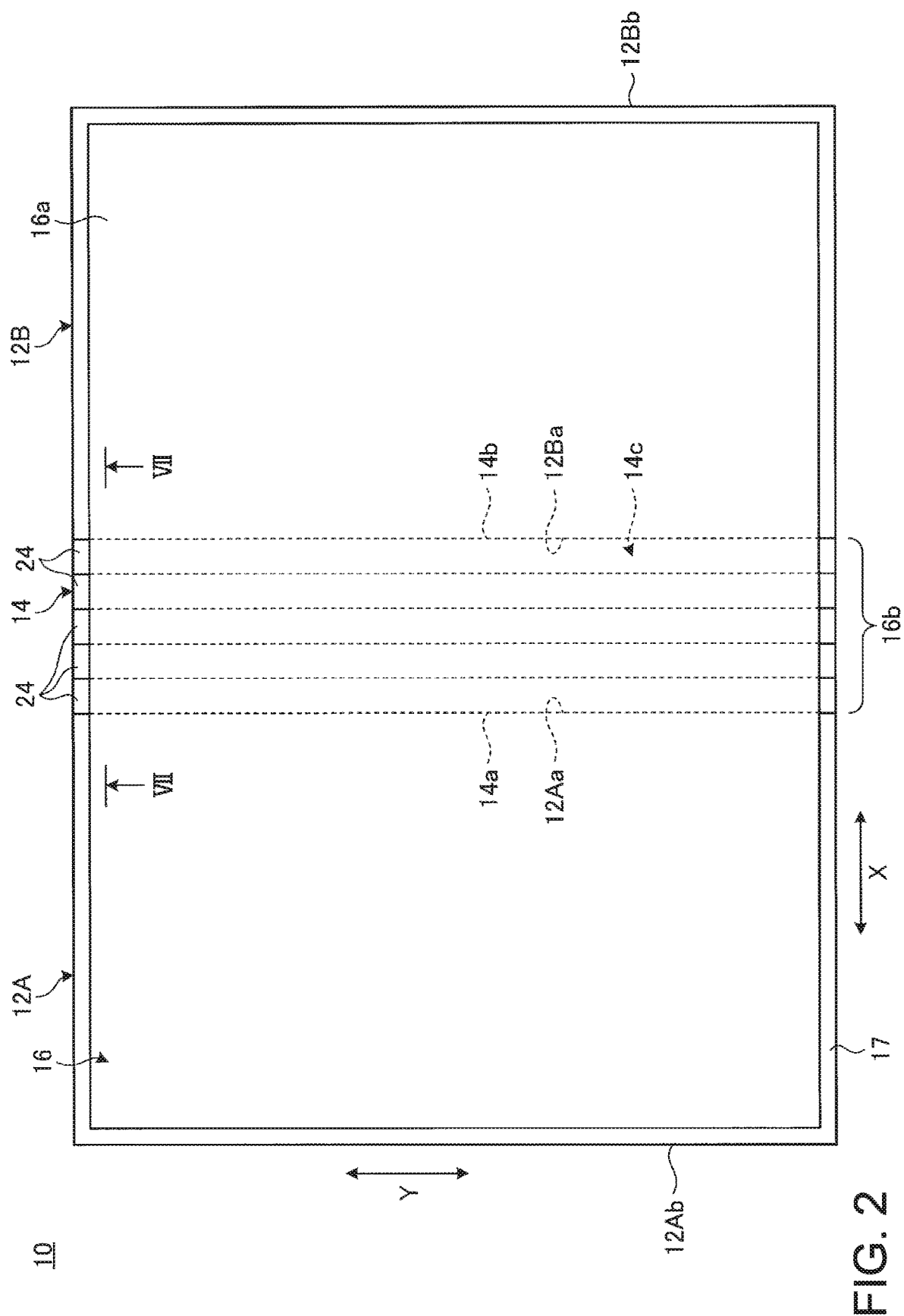
FIG. 2 is a plan view illustrating a state where the portable information apparatus from FIG. 1 is opened to a used form.
Figure 3:
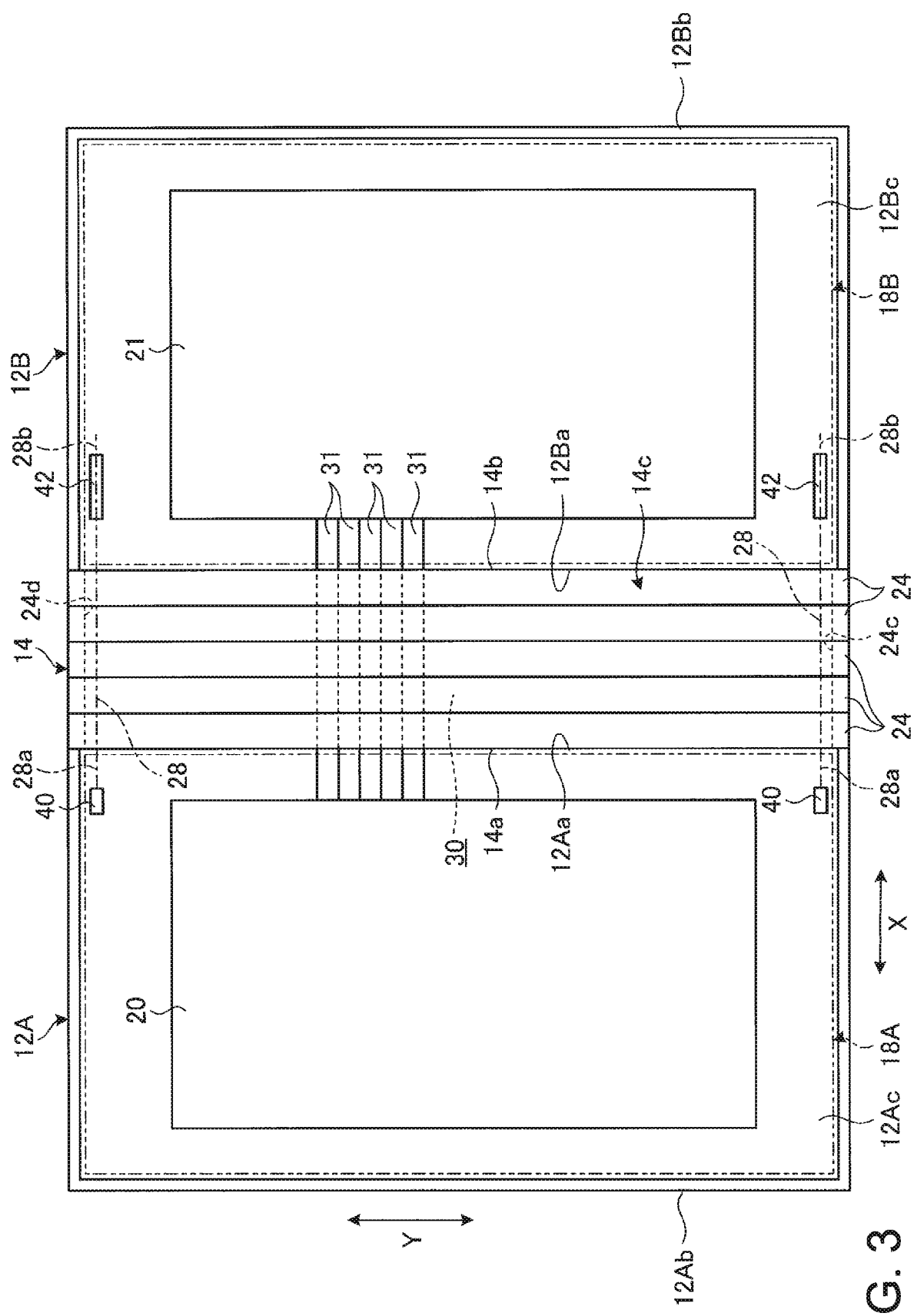
FIG. 3 is a plan view schematically illustrating one example of an inner structure of the portable information apparatus which is illustrated in FIG. 2.

FIG. 1 is a perspective view of a state where a portable information apparatus 10 according to one embodiment of the present invention is closed to a housed form. FIG. 2 is a plan view schematically illustrating one example of a state where the portable information apparatus 10 illustrated in FIG. 1 is opened to a used form. FIG. 3 is a plan view schematically illustrating one example of an inner structure of the portable information apparatus 10 illustrated in FIG. 2.

As illustrated in FIG. 1 to FIG. 3, the portable information apparatus 10 includes a first chassis 12A, a second chassis 12B, a hinge device 14 and a display 16. The portable information apparatus 10 according to one embodiment is a tablet-type PC which is foldable just like a book. The portable information apparatus 10 may be a cell phone, a smartphone, an electronic notebook, a portable game machine and so forth.

Each of the chassis 12A and 12B is a rectangular flat box body, side plates are formed upright on four peripheral side faces of a baseplate of each chassis, and the display 16 is disposed on upper faces 12Ad and 12Bd of the chassis 12A and 12B. Each of the chassis 12A and 12B is configured by, for example, a metal plate which is made of stainless steel, magnesium, aluminum and so forth, a fiber reinforced resin plate which contains reinforced fibers such as carbon fibers and other fibers and so forth.

The chassis 12A and 12B are disposed side by side with the hinge device 14 being interposed. In the first chassis 12A, one side face 12Aa which is located on the second chassis 12B side is coupled with one side face 14a of the hinge device 14. In the second chassis 12B, one side face 12Ba which is located on the first chassis 12A side is coupled with the other side face 14b of the hinge device 14. The chassis 12A and 12B are coupled together via the hinge device 14 to be rotationally movable. It is possible to operate the chassis 12A and 12B to a desirable angular position between the housed form of the apparatus 10 which is illustrated in FIG. 1 and the used form of the apparatus 10 which is illustrated in FIG. 2. In the chassis 12A and 12B, side faces 12Ab and 12Bb which are opposite to side faces on the hinge device 14 side are formed as open ends.

The hinge device 14 is disposed between side faces 12Aa and 12Ba of the chassis 12A and 12B and couples the chassis 12A and 12B together to be rotationally movable. The portable information apparatus 10 according to one embodiment is configured that the center of rotational movement between the chassis 12A and 12B via the hinge device 14 coincides with a front face 16a of the display 16. A specific configuration example of the hinge device 14 will be described in detail later.

In the following, the portable information apparatus 10 will be described by calling a direction that the chassis 12A and 12B are disposed side by side as an X direction and a direction which is orthogonal to the X direction and in which the hinge device 14 extends as a Y direction as illustrated in FIG. 1 to FIG. 3.

The display 16 is, for example, a touch panel type liquid crystal display. The display 16 is a flexible display such as, for example, an organic Electro Luminescence (EL) display and so forth having a highly flexible electronic paper structure. The display 16 is opened and closed in association with opening and closing operations of the chassis 12A and 12B. A bezel member 17 is disposed on an outer peripheral edge of the front face 16a of the display 16 (see FIG. 2). The bezel member 17 covers a non-display area (a non-active area) of the outer peripheral edge other than a display area (an active area) of the front face 16a of the display 16.

The display 16 is disposed so as to extend across inner faces 12Ac and 12Bc of the chassis 12A and 12B (see FIG. 3). The display 16 is supported to the inner faces 12Ac and 12Bc via a first support plate 18A and a second support plate 18B. As indicated by a two-point chain line in FIG. 3, the support plates 18A and 18B are thin plate members which are formed into rectangular shapes respectively. The first support plate 18A is fixed to the first chassis 12A. The second support plate 18B is fixed to the second chassis 12B. The display 16 is fixed to upper faces of the support plates 18A and 18B with double-sided tape and so forth. A belt-shaped area of the display 16 which overlaps the hinge device 14 constitutes a bending area 16b. The bending area 16b is supported by a front face 14c of the hinge device 14. The bending area 16b is not fixed to the hinge device 14 and the support plates 18A and 18B and is in a relatively movable state.

For example, a substrate 20 on which various semiconductor chips and so forth are mounted, a battery device and, in addition, various communication modules, a cooling device and so forth are contained in the chassis 12A and 12B. These electronic components and so forth are contained in spaces which are formed between the inner face 12Ac and the support plate 18A and between the inner face 12Bc and the support plate 18B respectively.

Figure 4A:
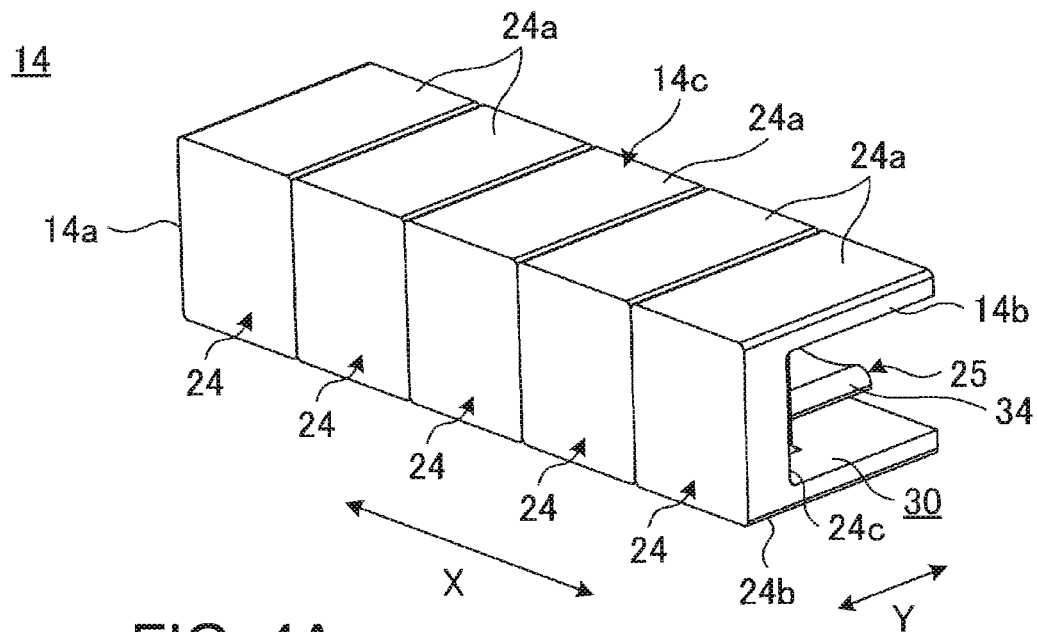
FIG. 4A is an enlarged sectional perspective view illustrating a Y-direction one end and its peripheral area of a hinge device in the used form of the apparatus.
Figure 4B:
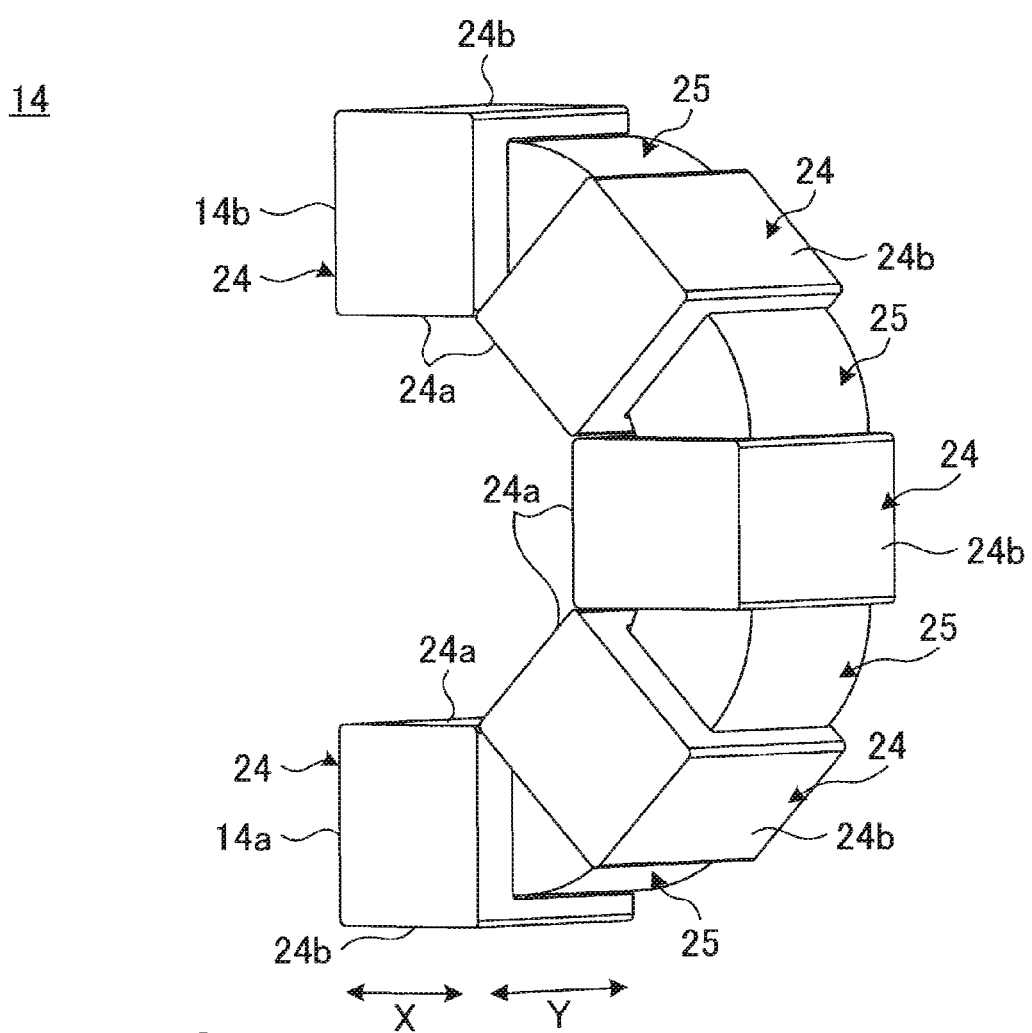
FIG. 4B is an enlarged sectional perspective view illustrating a state of the hinge device which is illustrated in FIG. 4A in the housed form of the apparatus.
Figure 5A:
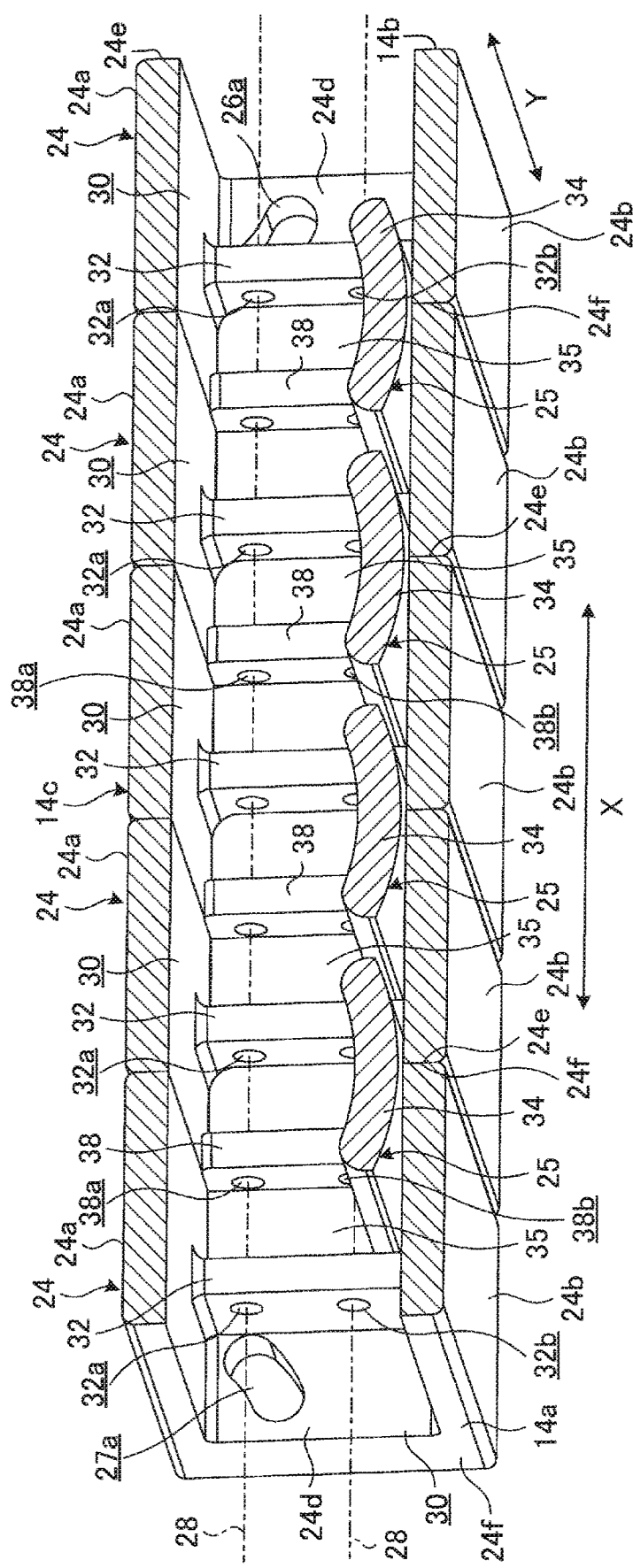
FIG. 5A is an enlarged sectional perspective view illustrating a Y-direction other end and its peripheral area of the hinge device in the used form of the apparatus.
Figure 5B:
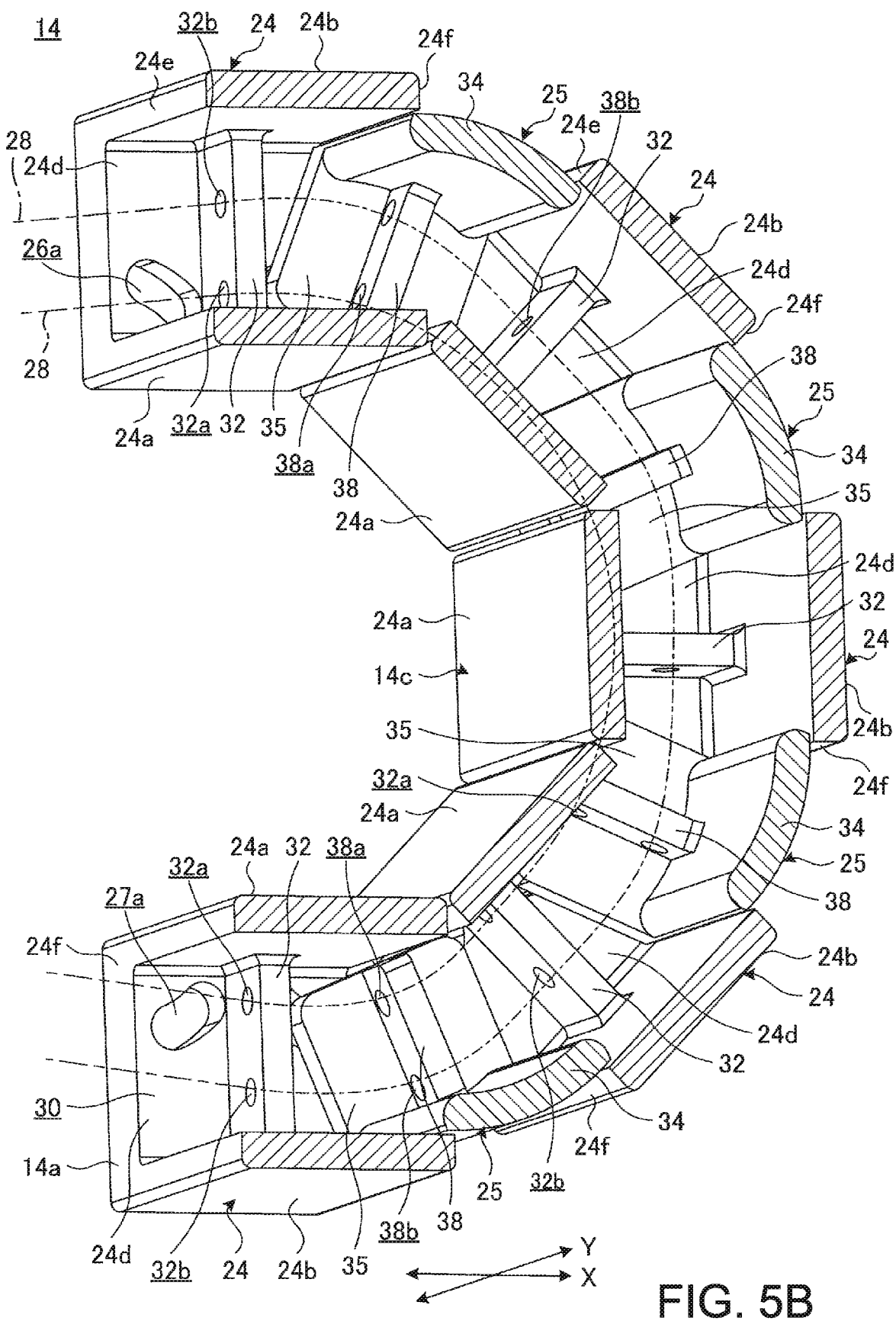
FIG. 5B is an enlarged sectional perspective view illustrating a state of the hinge device from FIG. 5A in the housed form of the apparatus.
Figure 6A:
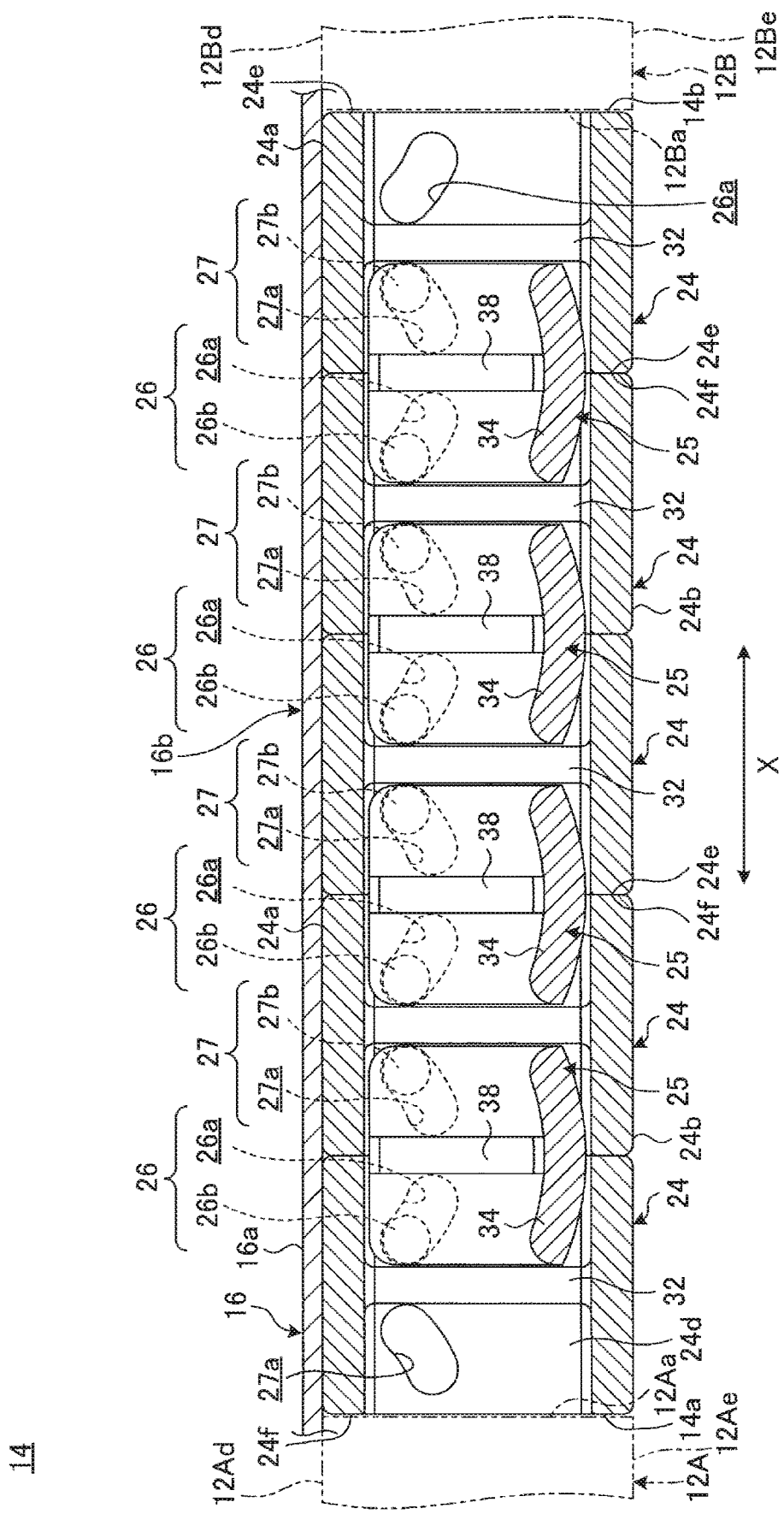
FIG. 6A is a front sectional diagram illustrating the hinge device from FIG. 5A.
Figure 6B:
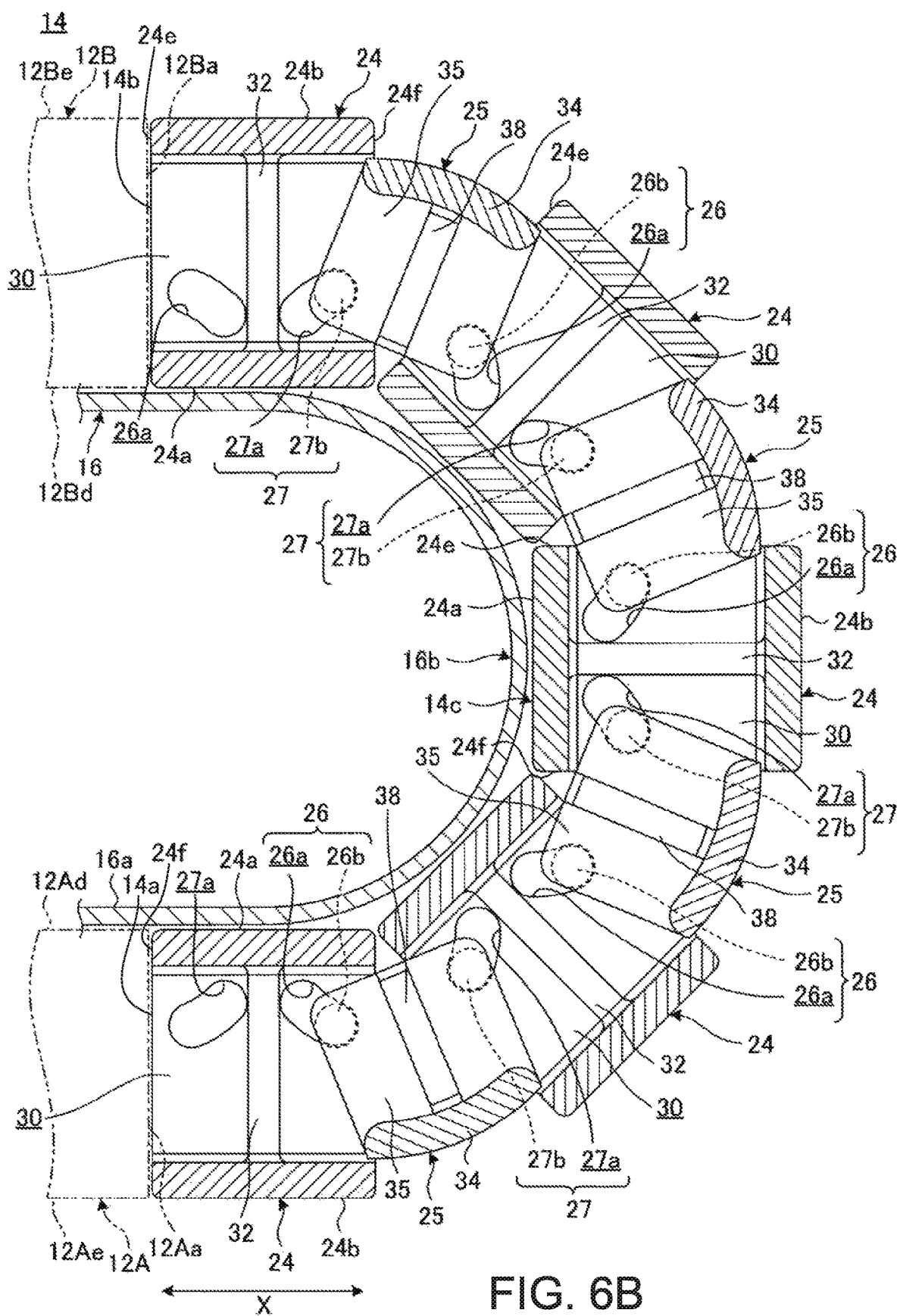
FIG. 6B is a front sectional diagram illustrating a state of the hinge device from FIG. 6A in the housed form of the apparatus.

Next, a specific configuration example of the hinge device 14 will be described. FIG. 4A is an enlarged sectional perspective view illustrating one example of a Y-direction one end (a lower end in FIG. 3) and its peripheral area of the hinge device 14 in the used form of the apparatus 10. FIG. 4B is an enlarged sectional perspective view illustrating one example of a state of the hinge device 14 which is illustrated in FIG. 4A in the housed form of the apparatus 10. FIG. 5A is an enlarged sectional perspective view illustrating one example of the Y-direction other end (an upper end in FIG. 3) and its peripheral area of the hinge device 14 in the used form of the apparatus 10. FIG. 5B is an enlarged sectional perspective view illustrating one example of a state of the hinge device 14 which is illustrated in FIG. 5A in the housed form of the apparatus 10. FIG. 6A is a front sectional diagram illustrating one example of the hinge device 14 which is illustrated in FIG. 5A. FIG. 6B is a front sectional diagram illustrating one example of a state of the hinge device 14 which is illustrated in FIG. 6A in the housed form of the apparatus 10.

As illustrated in FIG. 4A to FIG. 6B, the hinge device 14 includes a plurality of outer shell members 24, a plurality of inner shell members 25, a plurality of first coupling sections 26, a plurality of second coupling sections 27 and a plurality of wire members 28.

The plurality (five in one embodiment) of outer shell members 24 is disposed side by side along an arrangement direction (the X direction) of the chassis 12A and 12B. The respective outer shell members 24 are disposed side by side in order between the side faces 12Aa and 12Ba of the chassis 12A and 12B. Each outer shell member 24 is a square-tube-shaped component which is made of a resin material and so forth and is long in the Y direction. A hollow part 30 which penetrates in the X direction and is rectangular in section is formed in each outer shell member 24.

Upper faces 24a of the respective outer shell members 24 form the front face 14c of the hinge device 14 as a whole. The respective upper faces 24a are arranged side by side with almost no gap and form one plane together with upper faces of the support plates 18A and 18B (see FIG. 6A and FIG. 7) in the used form of the apparatus 10. The respective upper faces 24a of the outer shell members 24 are almost on the same plane as the upper faces 12Ad and 12Bd of the chassis 12A and 12B in the used form of the apparatus 10. The respective upper faces 24a of the outer shell members 24 are arranged side by side with almost no gap in the form of an arc (see FIG. 5B and FIG. 6B) and form a curved face via which the upper faces of the support plates 18A and 18B are connected together in the form of the arc in the housed form of the apparatus 10. The front face 14c of the hinge device 14 forms a connection face via which the upper faces of the support plates 18A and 18B are made contiguous to each other in this way. The front face 14c of the hinge device 14 constitutes a support face which supports the bending area 16b of the display 16. The front face 14c of the hinge device 14 is almost on the same plane as the upper faces 12Ad and 12Bd of the chassis 12A and 12B. Lower faces 24b of the respective outer shell members 24 form an outer face of the hinge device 14 as a whole. The respective lower faces 24b of the outer shell members 24 are almost on the same plane as lower faces 12Ae and 12Be of the chassis 12A and 12B. The respective lower faces 24b of the outer shell members 24 constitute a spine part of the portable information apparatus 10.

In each outer shell member 24, the hollow part 30 is a space which is defined by a back face of the upper face 24a, a back face of the lower face 24b, an inner face 24c of one end in the Y direction and an inner face 24d of the other end in the Y-direction. Therefore, the hollow part 30 is formed as a space which is wide in the Y direction. The hollow part 30 allows insertion of a cable 31 for power supply used for electric connection between the chassis 12A and 12B, communication and so forth (see FIG. 3).

In each outer shell member 24, columnar members 32 are respectively formed on the inner faces 24c and 24d which are located on both Y-direction ends and form the hollow part 30. The columnar members 32 respectively jut out from the inner faces 24c and 24d into the hollow part 30 respectively. The columnar members 32 stand upright between a back face of the upper face 24a and a back face of the lower face 24b. The columnar members 32 are disposed on X-direction centers of the inner faces 24c and 24d respectively. For example, two stages of upper and lower through-holes 32a and 32b are formed in upper and lower parts of each columnar member 32. The though holes 32a and 32b pass through each columnar member 32 in the X direction. The through-holes 32a and 32b are holes through which the wire members 28 pass. Since a configuration of the inner face 24c and the columnar member 32 which is disposed on the inner face 24c is the same as the configuration of the inner face 24d and the columnar member 32 which is illustrated in FIG. 5A and so forth in structure except that the both configurations are symmetrical to each other in shape, detailed description and illustration thereof are omitted.

Further, in each outer shell member 24, a first guide groove 26a and a second guide groove 27a are formed in the inner face 24d (24c) (see FIG. 6A and FIG. 6B). The first guide groove 26a is formed in a second chassis 12B side area of the inner face 24d (24c) which is adjacent to the columnar member 32. The first guide groove 26a is an elongated hole which is slightly curved while inclining downward in a direction that the groove 26a is gradually apart from the columnar member 32. The first guide groove 26a exhibits an almost bean-like shape in a front view.

In each outer shell member 24, the second guide groove 27a is formed in a first chassis 12A side area of the inner face 24d (24c) which is adjacent to the columnar member 32. The second guide groove 27a is formed symmetrically to the first guide groove 26a with the columnar member 32 being set as a reference. A second guide pin 27b of each inner shell member 25 is inserted into the second guide groove 27a. The second guide groove 27a and the second guide pin 27b configure the second coupling section 27. The guide grooves 26a and 27a are formed so as to exhibit an arc shape with the front face 16a of the display 16 being set as the center in such a manner that the rotation center of the hinge device 14 coincides with the front face 16a of the display 16.

As illustrated in FIG. 4A to FIG. 6B, a plurality (four in one embodiment) of the inner shell members 25 is arranged side by side along the X direction in the hollow parts 30 of the outer shell members 24 which are arranged side by side in the X direction. Each inner shell member 25 is arranged at a position where the inner shell member 25 strides over at least a boundary between the lower faces 26b of the mutually adjacent outer shell members 24 and 24, that is, between the columnar members 32 and 32 of the mutually adjacent outer shell members 24 and 24. Accordingly, each inner shell member 25 strides over end faces 24e and 24f of the mutually adjacent outer shell members 24 and 24. The end face 24e is the end face of one of the mutually adjacent outer shell members 24 and 24. The end face 24f is the end face of the other of the mutually adjacent outer shell members 24 and 24. The end faces 24e and 24f mutually face. Incidentally, the end face 24f of the outer shell member 24 which is the closest to the first chassis 12A configures the side face 14a of the hinge device 14. The end face 24e of the outer shell member 24 which is the closest to the second chassis 12B configures the side face 14b of the hinge device 14.

Each inner shell member 25 has a cover plate part 34 and an attachment plate part 35.

In each inner shell member 25, the cover plate part 34 has a slightly curved arc shape in a front view. The cover plate parts 34 are formed so as to exhibit an arc shape with the front face 16a of the display 16 being set as the center. The cover plate part 34 is disposed along inner faces which are opposite to the upper face 24a sides in the hollow parts 30 of the mutually adjacent shell members 24. That is, the cover plate part 34 is disposed along back faces of the lower faces 24b of the mutually adjacent outer shell members 24. The cover plate part 34 closes a gap which is formed between the lower faces 24b and 24b of the mutually adjacent outer shell members 24 and 24 in the housed form of the apparatus 10 (see FIG. 5B and FIG. 6B). Accordingly, the cover plate part 34 is curved so as to follow the arced arrangement of the respective outer shell members 24 in the housed form of the apparatus 10. The cover plate part 34 is completely housed in the hollow parts 30 of the mutually adjacent outer shell members 24 in the used form of the apparatus 10 (see FIG. 5A and FIG. 6A).

In each inner shell member 25, the attachment plate part 35 is a rectangular plate part which stands upright between the columnar members 32 and 32 of the mutually adjacent outer shell members 24 and 24. The attachment plate part 35 stands upright from one end of the cover plate part 34 toward the upper face 24a sides of the mutually adjacent outer shell members 24 and 24. The attachment plate part 35 abuts on the inner faces 24d in the hollow parts 30 of the mutually adjacent outer shell members 24 and 24 to be slidable. The attachment plate parts 35 and 35 are disposed so as to abut on the inner faces 24c and 24d on the Y-direction both ends of the mutually adjacent outer shell members 24 and 24 respectively. That is, one pair of the attachment plate parts 35 is disposed on the Y-direction both ends of each inner shell member 25 to be symmetrical to each other in structure. A columnar member 38, a first guide pin 26b and the second guide pin 27b are installed on each attachment plate part 35.

In each inner shell member 25, the columnar member 38 juts out from an inner face of the attachment plate part 35 which faces the hollow part 30 sides into the hollow parts 30 of the mutually adjacent outer shell members 24. The columnar member 38 stands upright between back faces of the upper faces 24a of the mutually adjacent outer shell members 24 and an upper face of the cover plate part 34. The columnar member 38 is disposed at the X-direction center of the attachment plate part 35. For example, two stages of upper and lower through-holes 38a and 38b are formed in upper and lower parts of the columnar member 38. The through-holes 38a and 38b pass through the columnar member 38 in the X direction. The through-holes 38a and 38b are holes into which the wire members 28 are inserted. The through-holes 38a and 38b are arranged alternately with the through-holes 32a and 32b in each columnar member 32. Thereby, the wire member 28 is alternately inserted into the through-holes 32a and 38a. In addition, the wire member 28 is alternately inserted into the through-holes 32b and 38b. Since a configuration of the attachment plate part 35 which abuts on the inner faces 24c and the columnar member 38 which is disposed on the attachment plate part 35 is the same as the configuration of the attachment plate part 35 and the columnar member 38 which is illustrated in FIG. 5A and so forth in structure except that the both configurations are symmetrical to each other in shape, detailed description and illustration thereof are omitted.

In each inner shell member 25, the first guide pin 26b and the second guide pin 27b are projectingly disposed on a back face of the attachment plate part 35 which is opposite to the hollow part 30 sides. That is, the guide pins 26b and 27b project from an outer face of the attachment plate part 35 toward the inner faces 24d of the mutually adjacent outer shell members 24. The first guide pin 26b is formed in a first chassis 12A side area of the attachment plate part 35 which is adjacent to the columnar member 38 and is inserted into the first guide groove 26a to be slidable and rotationally movable. The second guide pin 27b is formed in a second chassis 12B side area of the attachment plate part 35 which is adjacent to the columnar member 38 and is inserted into the second guide groove 27a to be slidable and rotationally movable.

The guide pins 26b and 27b are inserted into the respective guide grooves 26a and 27a in the mutually adjacent outer shell members 24 and 24 and thereby each inner shell member 25 couples the mutually adjacent outer shell members 24 and 24 together. That is, each inner shell member 25 is coupled with the first chassis 12A side outer shell member 24 of the mutually adjacent outer shell members 24 and 24 via the first coupling section 26. Further, each inner shell member 25 is also coupled with the second chassis 12B side outer shell member 24 of the mutually adjacent outer shell members 24 and 24 via the second coupling section 27.

In each inner shell member 25, the cover plate part 34 and one pair of the attachment plate parts 35 and 35 are disposed in an almost U-shape and are arranged along lower inner faces and side inner faces (the inner faces 24c and 24d) of the hollow parts 30 of the mutually adjacent outer shell members 24 in this way and therefore each inner shell member 25 does not fill up the hollow parts 30 of the mutually adjacent outer shell members 24.

The wire member 28 is a highly elastic metal wire and, for example, a hyper-elastic wire. For example, four wire members 28 are used. In the four wire members 28, two wire members 28 are inserted into the through-holes 32a and 32b in the columnar member 32 which is located on the inner face 24d side of each outer shell member 24 and the through-holes 38a and 38b in the columnar member 38 of each inner shell member 25 which is disposed side by side with the columnar member 32. The remaining two wire members 28 are inserted into the through-holes 32a and 32b in the columnar member 32 which is located on the inner face 24c side of each outer shell member 24 and the through-holes 38a and 38b in the columnar member 38 of each inner shell member 25 which is disposed side by side with the columnar member 32. Since FIG. 3 is a plan view, the two wire members 28 on the inner face 24d side mutually overlap and the two wire members 28 on the inner face 24c side also mutually overlap, every one of them is illustrated in FIG. 3.

Figure 7:
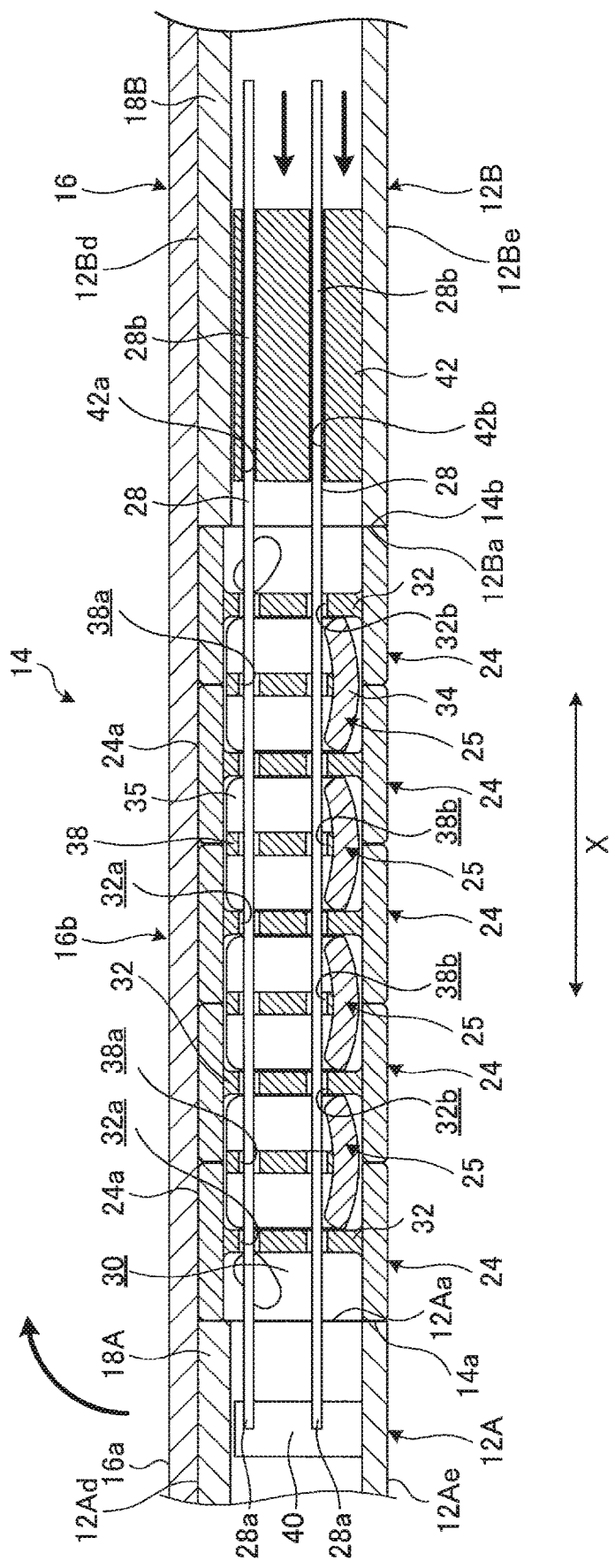
FIG. 7 is a sectional diagram taken along the VII-VII line in FIG. 2.

FIG. 7 is a schematic sectional diagram along the VII-VII line in FIG. 2. As illustrated in FIG. 7, one end 28a of each wire member 28 is fixed by a fixing member 40 and the other end 28b of each wire member 28 is supported by a wire grip part 42 (also, see FIG. 3).

The fixing member 40 is disposed, for example, on the inner face 12Ac of the first chassis 12A and fixes one end 28a of each wire member 28. The wire grip part 42 is disposed, for example, on the inner face 12Bc of the second chassis 12B and slidably supports the other end 28b of each wire member 28. The wire grip part 42 has a friction hole 42a which is disposed coaxially with the respective through-holes 32a and 38a and a friction hole 42b which is disposed coaxially with the respective through-holes 32b and 38b. The friction holes 42a and 42b hold the other end 28b of the inserted wire member 28 to be slidable in an axis direction via predetermined friction force. Thereby, it becomes possible to apply predetermined frictional resistance to movement of the wire member 28 through the friction holes 42a and 42b. That is, the wire grip part 42 and the wire member 28 function as a resistance application section which apples predetermined frictional resistance and tension to relative rotational moving operations of the outer shell members 24 and the inner shell members 25.

Next, a rotational moving operation which is performed between the first chassis 12A and the second chassis 12B via the hinge device 14 according to one embodiment and operational effects which are brought about by the hinge device 14 will be described.

In the hinge device 14, the end face 24e of one of the mutually adjacent outer shell members 24 abuts on the end face 24f of the other outer shell member 24 over the entire surfaces in the used form of the apparatus 10 which is illustrated in FIG. 5A and FIG. 6A. Thereby, a state where the respective hollow parts 30 form a tunnel-like space which extends in the X direction and the respective inner shell members 25 are contained in the space is obtained. In this state, the front face 14c (the upper faces 24a) of the hinge device 14 is disposed in a state of being arrayed side by side with the upper faces 12Ad and 12Bd of the chassis 12A and 12B (the upper faces of the support plates 18A and 18B) almost on the same plane (see FIG. 7).

In the used form of the apparatus 10, the respective guide pins 26b and 27b are disposed on upper ends of the respective guide grooves 26a and 27a (see FIG. 6A) and are located at positions where the mutually adjacent outer shell members 24 and 24 are closest to each other. Thereby, the hinge device 14 is in a state where a distance between the mutually adjacent outer shell members 24 and 24 is minimized and the entire X-direction length is minimized. Accordingly, the wire member 28 is in a state where the other end 28b is inserted into the friction hole 42a (42b) down to the deepest part.

Accordingly, in the hinge device 14, the mutually adjacent outer shell members 24 and 24 abut on each other and form one square tube structure in the used form of the apparatus 10. Thereby, it becomes possible for the front face 14c of the hinge device 14 to support the back face of the bending area 16b of the opened-state display 16 with high strength. Accordingly, the entire surface of the display 16 is supported by the hinge device 14 and the support plates 18A and 18B and thereby shock resistance of the display 16 and rigidity thereof when a touching operation is performed on the display 16 are ensured. Moreover, since the hinge device 14 is brought into a state where the wire member 28 is stretched linearly with high tension in the used form of the apparatus 10, the rigidity of the display 16 is more increased.

Next, in a case where the portable information apparatus 10 is to be shifted from the used form (a 180-degree position) to the housed form (a 0-degree position) which is illustrated in FIG. 5B and FIG. 6B, for example, the user grips the respective chassis 12A and 12B with his/her left and right hands respectively and folds the chassis 12A and 12B in a direction that the display 16 is closed. In this case, in the hinge device 14, the mutually adjacent outer shell members 24 and 24 rotate relative to each inner shell member 25 via the first and second coupling sections 26 and 27. At the same time, the respective guide pins 26b and 27b move from upper ends to lower ends in the guide grooves 26a and 27a respectively (see FIG. 6B).

As a result, the hinge device 14 enters a state where, in the mutually adjacent outer shell members 24 and 24, corner parts of the end face 24e of one outer shell member 24 and of the end face 24f of the other outer shell member 24 which are near the upper faces 24a thereof come close to each other and parts of the end face 24e of one outer shell member 24 and of the end face 24f of the other outer shell member 24 which are near the lower faces 24b thereof are greatly separated from each other. Therefore, the hollow parts in the respective outer shell members 24 form the tunnel-like space which is curved into a U-shaped form. On the other hand, in each inner shell member 25, an upper end face of the attachment plate part 35 comes close to or abuts on ceilings of the hollow parts 30, that is, back faces of the upper faces 24a of the mutually adjacent outer shell members 24 and 24 and restricts further rotational movement via the respective coupling sections 26 and 27. Further, the cover plate part 34 is disposed so as to cover a gap between the end face 24e of one outer shell member 24 and the end face 24f of the other outer shell member 24 which are greatly separated from each other.

In the hinge device 14, the gap which is formed between the outer faces (the lower faces 24b) in the housed form of the apparatus 10 is covered with the cover plate part 34 (see FIG. 4B, FIG. 5B and FIG. 6B) in this way. That is, in the portable information apparatus 10, the hinge device 14 itself also functions as a spine member with no provision of the spine member and so forth as an additional component. Accordingly, it becomes unnecessary for the hinge device 14 to secure a cost involved in parts such as the spine member and so forth and to secure a space for installation of the spine member(s) in the chassis 12A and 12B and so forth. Accordingly, it becomes possible for the portable information apparatus 10 to suppress a reduction in appearance quality which would be induced in a case of mutually folding the chassis 12A and 12B in spite of the simple configuration.

The guide pins 26b and 27b are disposed on lower ends of the guide grooves 26a and 27a respectively (see FIG. 6B) and are positioned so as to most separate the mutually adjacent outer shell members 24 and 24 from each other in the housed form of the apparatus 10. That is, the hinge device 14 makes it possible to absorb an inner ring difference which is induced by making the rotation center of the hinge device 14 coincide with the front face 16a of the display 16 when performing a folding operation by an expansion/contraction operation in the X direction. Accordingly, the hinge device 14 makes it possible to smoothly bend the display 16 with the bending area 16b of the display 16 being maintained at a desirable curvature and thereby to suppress occurrence of breakage of the display 16. In addition, in this state, the front face 14c (the upper faces 24a) of the hinge device 14 takes a posture of supporting the back face of the display 16 by locating behind the display 16 so as to follow the curvature of the bending area 16b of the display 16 and being contiguous to the upper faces 12Ad and 12Bd of the chassis 12A and 12B (see FIG. 6B).

Further, in the hinge device 14, since the tension which is obtained from the wire member 28 is applied to all the outer shell members 24 and the inner shell members 25 when bending the display 16 as mentioned above and operating the display 16 reversely, the respective outer shell members 24 and the respective inner shell members 25 rotationally move equally and therefore the hinge device 14 is excellent in appearance. In addition, the wire member 28 is gripped by the wire grip part 42 at its other end 28b. Accordingly, in a case where the hinge device 14 is set at a desired angular position, the angular position is maintained with the aid of the frictional resistance that the wire grip part 42 applies to the wire member 28. Accordingly, it becomes possible to utilize the portable information apparatus 10 just like a Laptop PC by maintaining the angular position between the chassis 12A and 12B, for example, at about 120 degrees. That is, the wire grip part 42 and the wire member 28 may be alternatively called a toque generation part of the hinge device 14.

In addition, the hinge device 14 is capable of supporting the back face of the bending area 16b of the display 16 by the front face 14c regardless of the position of an angle between the chassis 12A and 12B. That is, for example, there is a possibility that the user may mutually fold the left and right chassis 12A and 12B in a state where the user presses his/her thumb and so forth against an X-direction center part or its peripheral part of the display 16 of the apparatus 10 which is opened to the used form. Even in this case, since the hinge device 14 supports the entire back face of the bending area 16b with the front face 14c, it becomes possible to suppress occurrence of breakages and malfunction of the display 16.

Figure 8A:
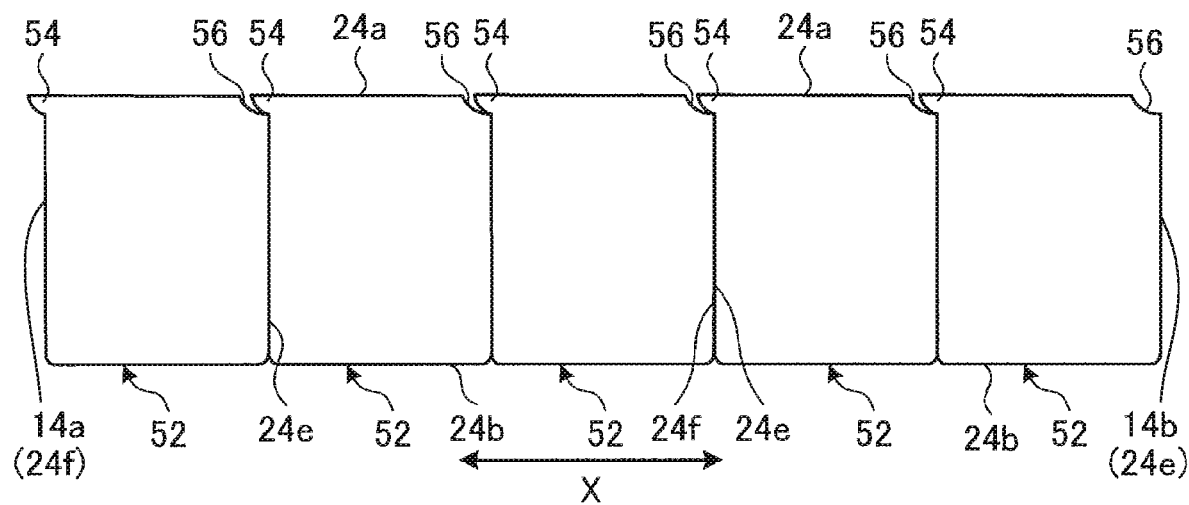
FIG. 8A is a front view illustrating a state of a hinge device according to a modified example in the used form of the apparatus.
Figure 8B:
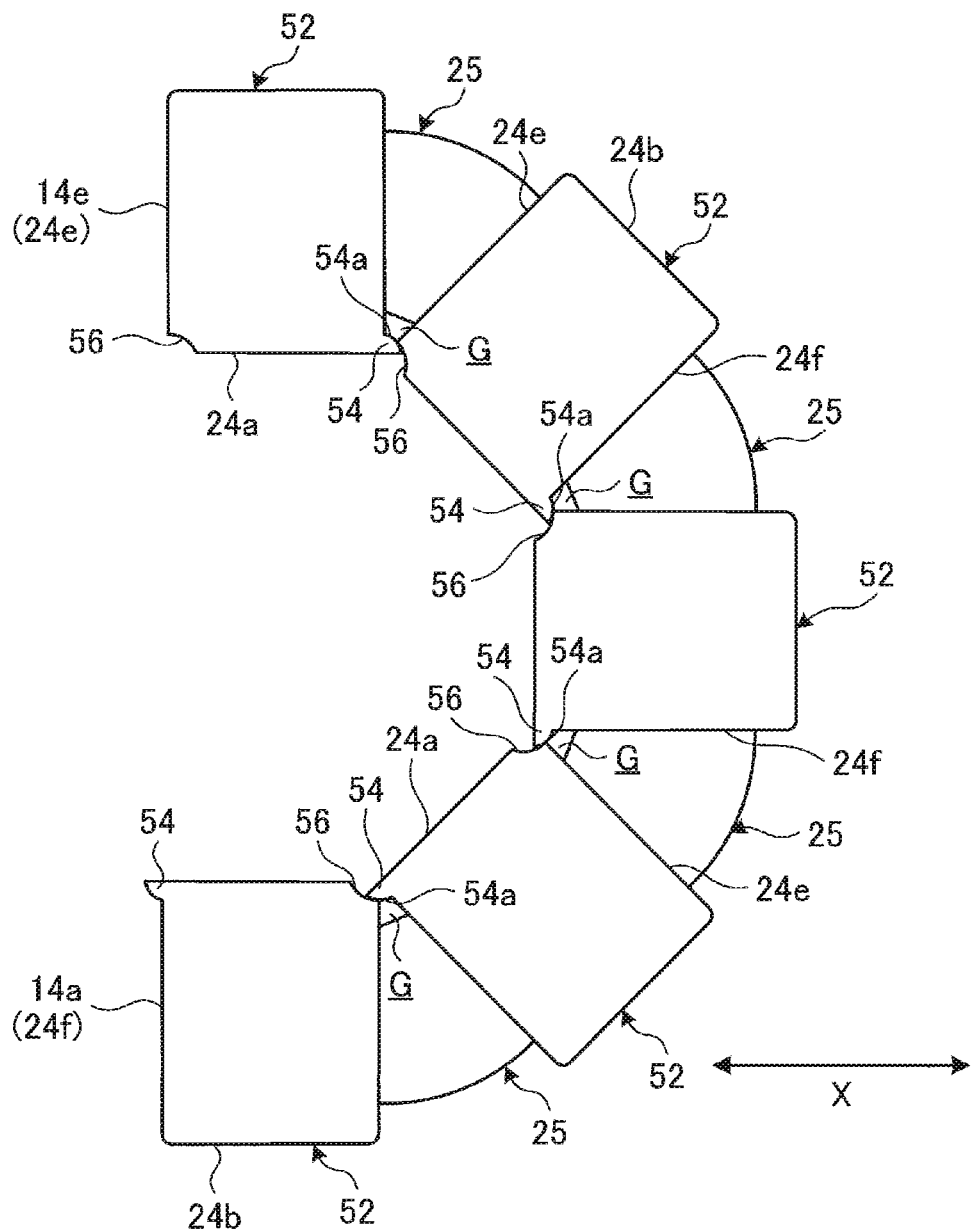
FIG. 8B is a front view illustrating a state of the hinge device from FIG. 8A in the housed form of the apparatus.
Figure 9A:
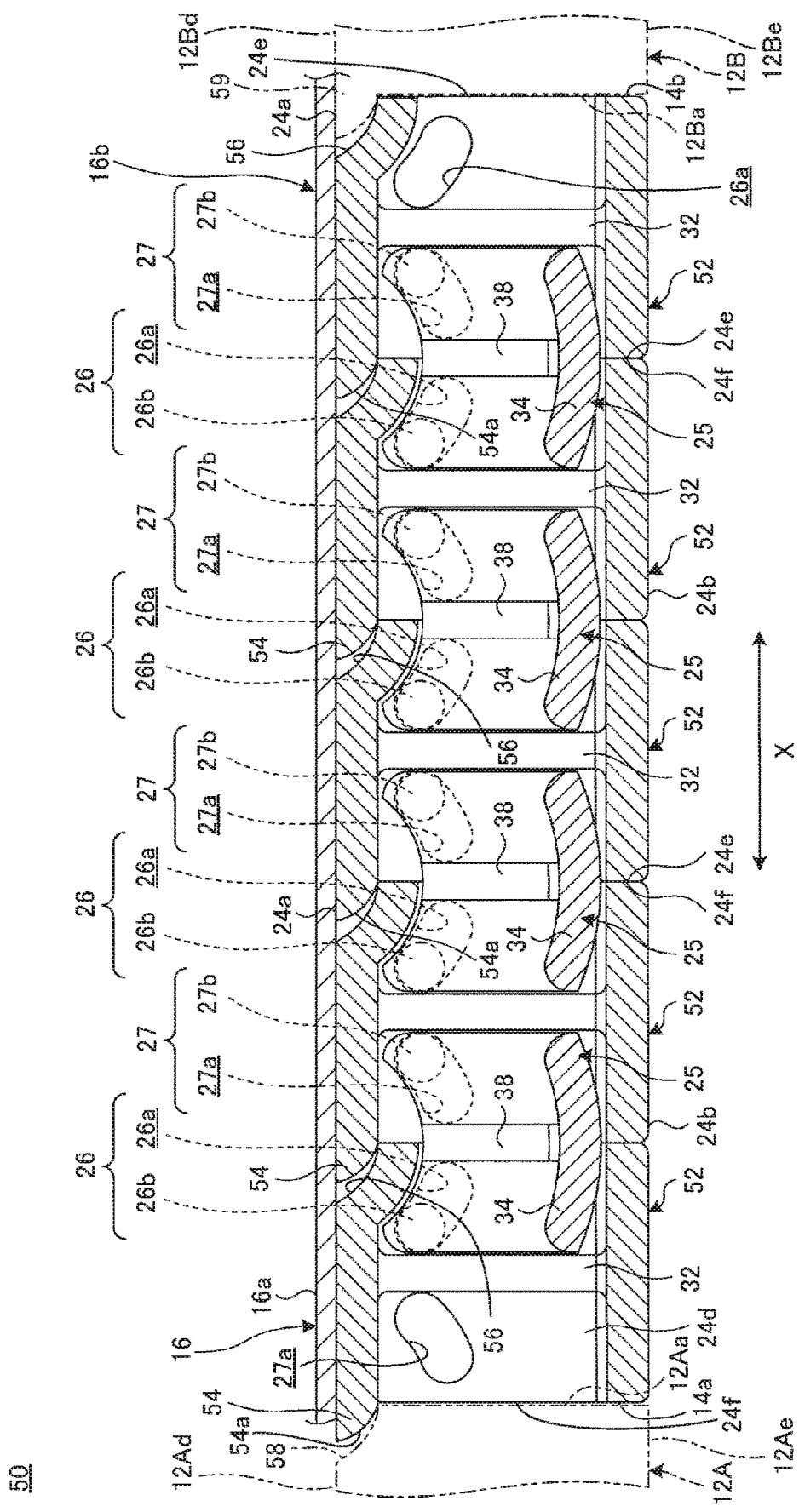
FIG. 9A is a front sectional diagram illustrating the hinge device from FIG. 8A.
Figure 9B:
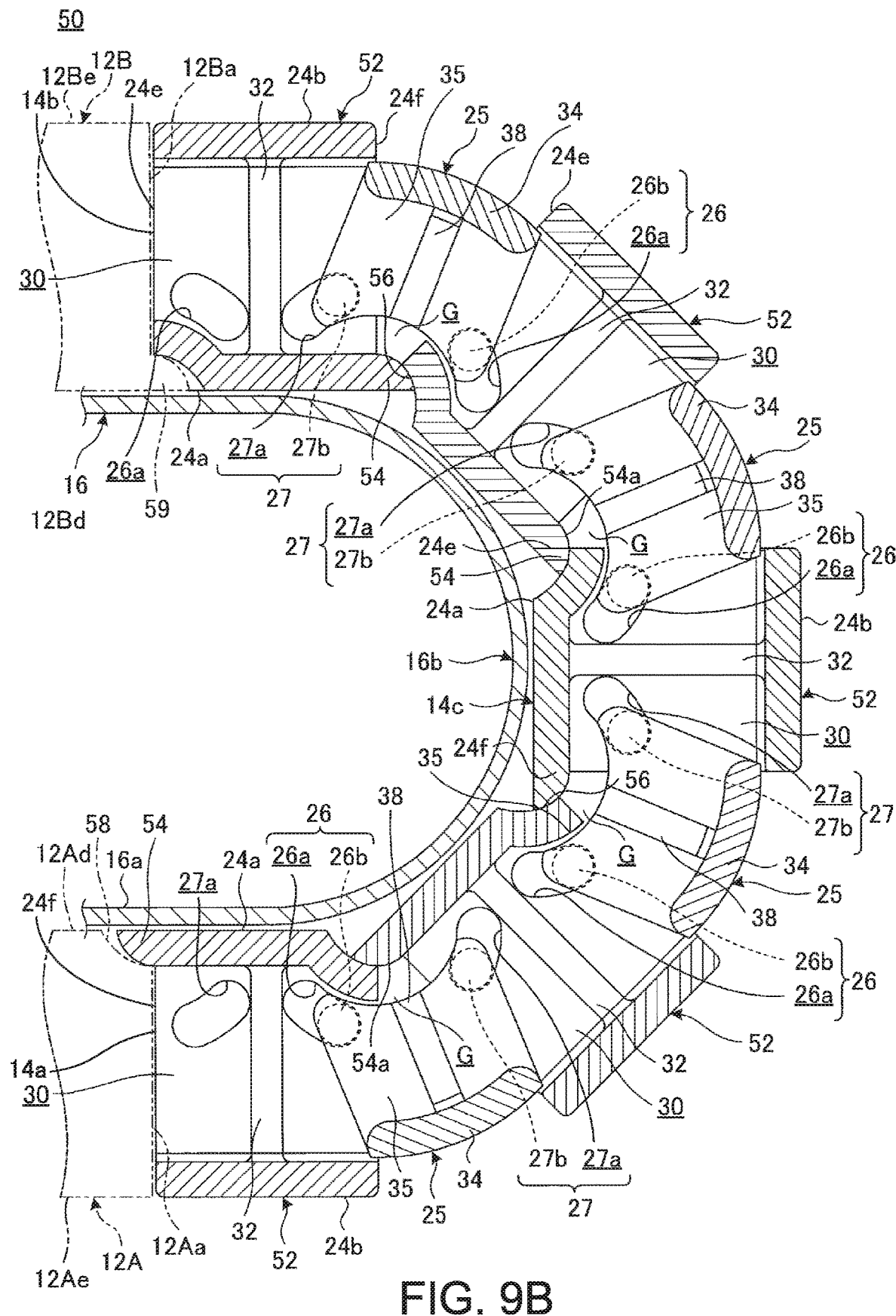
FIG. 9B is a front sectional diagram illustrating the hinge device from FIG. 8B.
Figure 10:
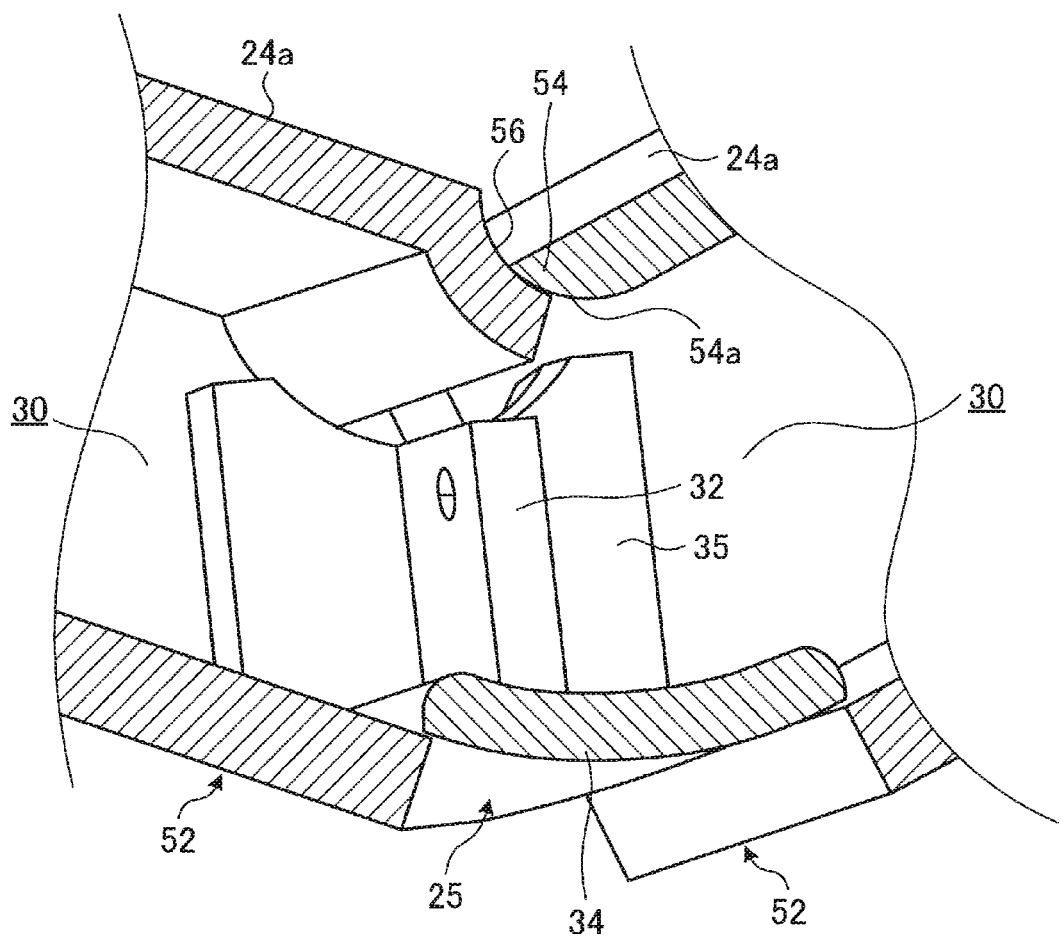
FIG. 10 is an enlarged sectional perspective view illustrating part of the hinge device from FIG. 9B.

FIG. 8A is a front view illustrating one example of a state of a hinge device 50 according to a modified example in the used form of the apparatus 10. FIG. 8B is a front view illustrating one example of a state of the hinge device 50 which is illustrated in FIG. 8A in the housed form of the apparatus. FIG. 9A is a front sectional diagram illustrating one example of the hinge device 50 which is illustrated in FIG. 8A. FIG. 9B is a front sectional diagram illustrating one example of the hinge device 50 which is illustrated in FIG. 8B. FIG. 10 is an enlarged sectional perspective view illustrating one example of part of the hinge device 50 which is illustrated in FIG. 9B. Incidentally, although illustration of the wire members 28 is omitted in FIG. 8A to FIG. 10, the wire members 28 are inserted into the through-holes also in the hinge device 50 in reality.

As illustrated in FIG. 8A to FIG. 10, the hinge device 50 includes outer shell members 52 which are different from the outer shell members 24 of the hinge device 14 in configuration. Each outer shell member 52 has a configuration that a projection part 54 and a reception part 56 are added to each outer shell member 24.

The projection part 54 is an eaves-shaped rib which projects from the end face 24f of each outer shell member 52 toward the adjacent outer shell member 52. The projection part 54 projects from an upper face 24a side part of the end face 24f. The projection part 54 is a tapered projection which extends over the full width-direction (Y-direction) length of each outer shell member 52. An upper face of the projection part 54 has a planar shape which extends from the upper face 24a in parallel. A lower face of the projection part 54 is configured as an arc-shaped sliding face 54a. The sliding face 54a is arched so as to gradually incline to the upper face 24a side toward a leading end of the projection part 54.

The reception part 56 is a recessed part formed by recessing a part on the end face 24e side of the upper face 24a of each outer shell member 52. The reception part 56 extends over the full width-direction (Y-direction) length of each outer shell member 52. The projection part 54 is disposed on the reception part 56 to be relatively movable. A front face of the reception part 56 is arced. The front face of the reception part 56 is a face (a slid face) on which the sliding face 54a of the projection part 54 slidably abuts. The front face of the reception part 56 is arched so as to gradually incline to the upper face 24a side toward a direction that the front face is separated from the end face 24e. The sliding face 54a of the projection part 54 and the slid face of the reception part 56 are arched with the front face 16a of the display 16 being set as the center.

In the hinge device 50, the end face 24f of the outer shell member 52 which is the closest to the first chassis 12A is coupled with the side face 12Aa of the first chassis 12A. As illustrated in FIG. 9A and FIG. 9B, a chassis-side reception part 58 which receives the projection part 54 is formed on the side face 12Aa of the first chassis 12A. The chassis-side reception part 58 has a shape and a function which are the same as the shape and the function of the reception part 56. In addition, in the hinge device 50, the end face 24e of the outer shell member 52 which is the closest to the second chassis 12B is coupled with the end face 12Ba of the second chassis 12B. As illustrated in FIG. 9A and FIG. 9B, a chassis-side projection part 59 under which the reception part 56 is disposed is formed on the side face 12Ba of the second chassis 12B. The chassis-side projection part 59 has a shape and a function which are the same as the shape and the function of the projection part 54. Provision of the chassis-side projection part 59 may be omitted. However, a configuration which includes the chassis-side projection part 59 has such an advantage that it becomes possible to suppress a level difference among all the upper faces 24a which receive the back face of the display 6 in the used form of the apparatus 10 as much as possible.

Accordingly, in the hinge device 50, the respective projection parts 54 are contained in the respective reception parts 56 in the used form of the apparatus 10 which is illustrated in FIG. 8A and FIG. 9A. Thereby, it becomes possible to configure the hinge device 50 so as to minimize generation of the level difference among the upper faces 24a of the respective outer shell members 52 due to presence of the reception parts 56. Accordingly, it becomes possible to stably support the back face of the display 16 by the upper faces 24a of the respective outer shell members 52 which are made almost plain in the used form of the apparatus 10.

The hinge device 50 is basically the same as the hinge device 24 in operation to be performed when shifting the apparatus 10 from the used form to the housed form. However, in the hinge device 50, the sliding face 54a of each projection part 54 slides on each reception part 56 when performing the folding operation. Accordingly, respective gaps G which are each formed between the mutually adjacent outer shell members 52 and 52 are gradually increased while being maintained mutually equally owing to an abutment action of each projection part 54 on each reception part 56. That is, crushing of some gaps G is suppressed by the abutment action of each projection part 54 on each reception part 56. For example, in a case where some gaps G are crushed, there is a fear that wrinkles and sagging will be generated on the display 16 with compressive force which is generated when some gaps G are crashed.

In this respect, in the hinge device 50, owing to the abutment action of each projection part 54 on each reception part 56, the gaps G are almost equally formed between all the mutually adjacent outer shell members 52 and 52 in the housed form of the apparats 10 which is illustrated in FIG. 8B and FIG. 9B. Accordingly, the back face of the display 16 is supported by the upper faces 24a of the respective outer shell members 52 which are formed into a predetermined arc-shape. As a result, it becomes possible for the hinge device 50 to surely hold the display 16 with the aid of the desired arc-shape which follows the curvature of the bending area 16b which is set at the time of designing the display 16 in the housed form of the apparatus 10.

The hinge device 50 may be configured that the reception part 56 is formed on the end face 24f and the projection part 54 is formed on the end face 24e. In addition, the hinge device 50 may be also configured that in the mutually adjacent outer shell members 52 and 52, the projection parts 54 are formed on the both end faces 24e and 24f of one outer shell member 52 and the reception parts 56 are formed on the both end faces 24e and 24f of the other outer shell member 52.

Incidentally, it goes without saying that the present invention is not limited to the above-described embodiment and it is possible to freely modify the present invention within a range not deviating from the gist of the present invention.

The configuration that the guide pin 26b (27b) and the guide groove 26a (27a) are used as the coupling section 26 (27) is exemplified as above. However, the coupling sections 26 (27) may be configured in other ways as long as the coupling section 26 (27) is of the type of coupling each outer shell member 24 (52) and each inner shell member 25 together to be rotationally movable. However, the configuration of the coupling section 26 (27) that the guide pin 26b (27b) and the guide groove 26a (27a) are used has such advantages that the configuration is simple and operational stability is high.

In addition, a configuration that in the coupling section 26 (27), the guide pin 26b (27b) is formed on each outer shell member 24 (52) and the guide groove 26a (27a) is formed in each inner shell member 25 may be also made. Incidentally, in this configuration, there is a possibility that the guide groove 26a (27a) which is formed in each inner shell member 25 may be exposed through the gap between the mutually adjacent outer shell members 24 and 24 in the used form of the apparatus 10. In addition, since each inner shell member 25 is smaller than each outer shell member 24 (52), in a case where the guide groove 26a (27a) is formed in each inner shell member 25, it becomes necessary to increase the size of each inner shell member 25 and, as a result, there is a possibility that the size of the whole hinge device 14 may be increased. Accordingly, it is more preferable to configure so as to form the guide pin 26b (27b) on each of the inner shell member 25 and to form the guide groove 26a (27a) in each outer shell member 24 (52) as in the configuration example which is illustrated in FIG. 6A, FIG. 6B and so forth.

The configuration that the frictional resistance is applied to the wire member 28 through the friction holes 42a and 42b in the wire grip part 42 is exemplified as the resistance application section as above. However, the resistance application section may be also configured that the resistance is applied to the wire member(s) 28 with the aid of, for example, sliding friction between the guide pin 26*b* (27*b*) and the guide groove 26*a* (27*a*). In addition, the resistance application section may be also configured to apply the frictional resistance to the wire member(s) 28 through, for example, the through-holes 32*a*, 32*b*, 38*a*, 38*b*. In addition, the wire member(s) 28 may be disposed in the form which is configured by one upper stage and one lower stage or the form which is configured by three or more stages and/or may be disposed, for example, at the X-direction center and so forth other than on the Y-direction both ends of the hinge device 14 (50). However, it is more preferable to dispose the wire members 28 on the Y-direction both ends of the hinge device 14 (50) because the wire members 28 do not obstruct routing of the cable 31 and so forth.

Figure 11A:
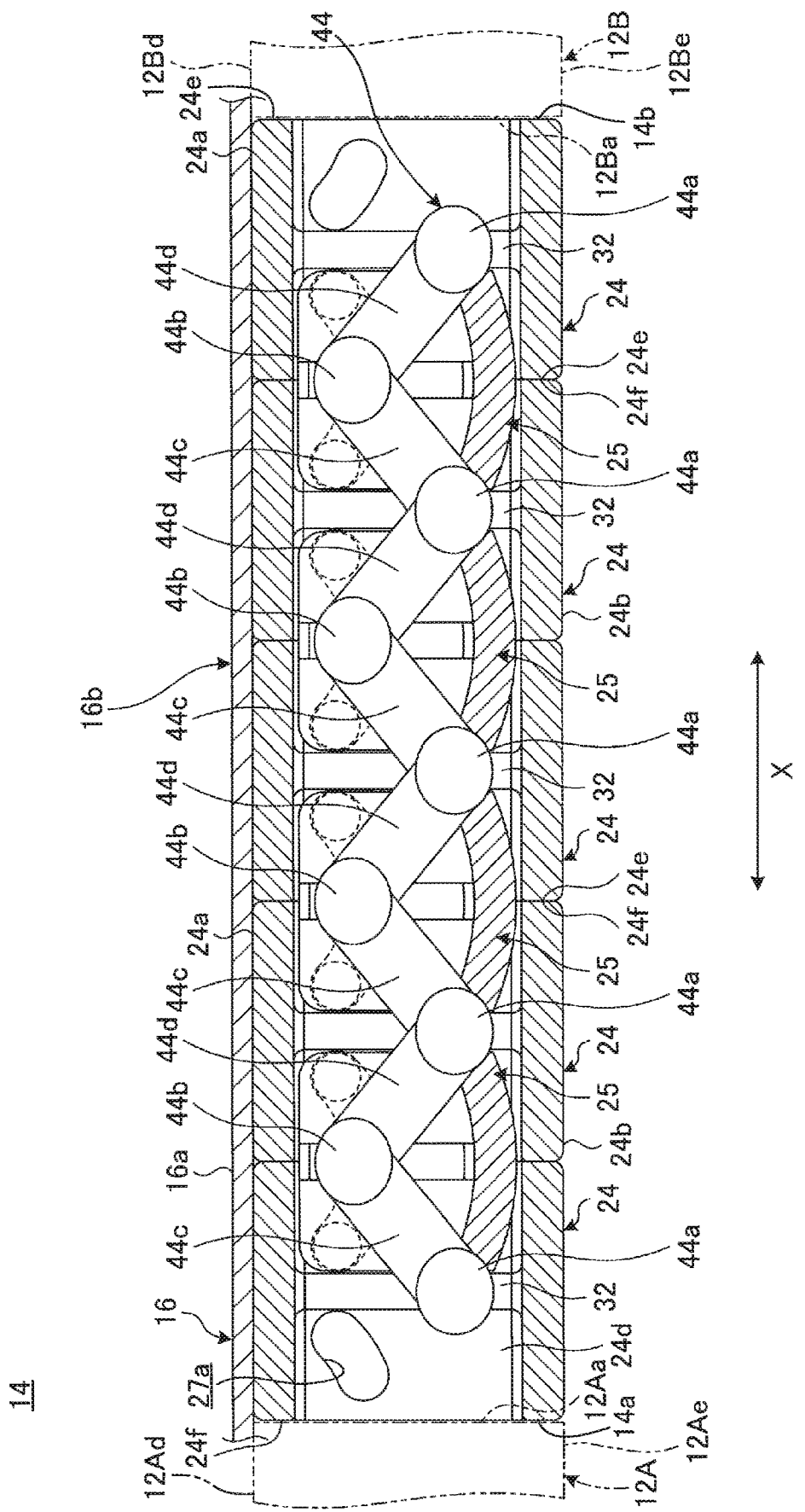
FIG. 11A is a front sectional diagram illustrating a state of a hinge device according to a modified example which is equipped with a resistance application section in the used form of the apparatus.
Figure 11B:
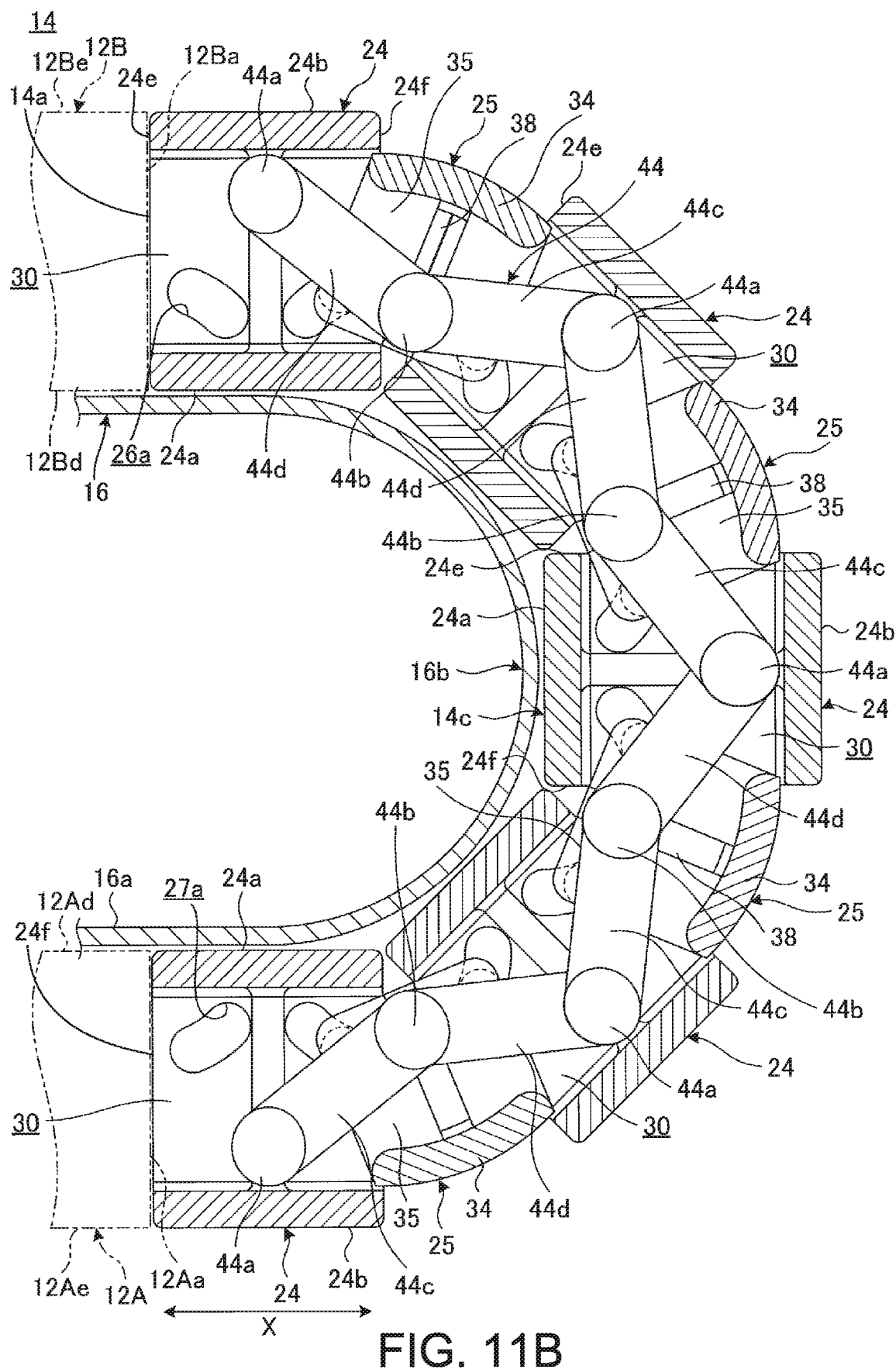
FIG. 11B is a front sectional diagram illustrating a state of the hinge device from FIG. 11A in the housed form of the apparatus.

A resistance application section 44 which has a different configuration may be used in place of the resistance application section which is configured by the wire member 28 and the wire grip part 42 as illustrated in FIG. 11A and FIG. 11B. The resistance application section 44 has a first pivot shaft 44*a*, a second pivot shaft 44*b*, a first pivot arm 44*c* and a second pivot arm 44*d*. The first pivot shaft 44*a* is attached to the columnar member 32 of each outer shell member 24. The second pivot shaft 44*b* is attached to the columnar member 38 of each inner shell member 25. The first pivot arm 44*c* is coupled to the first pivot shaft 44*a* which is attached to the columnar member 32 of one of the mutually adjacent outer shell members 24 and 24 and the second pivot shaft 44*b* which is attached to the columnar member 38 of each inner shell member 25 respectively to be rotationally movable. The second pivot arm 44*d* is coupled to the first pivot shaft 44*a* which is attached to the columnar member 32 of the other of the mutually adjacent outer shell members 24 and 24 and the second pivot shaft 44*b* which is attached to the columnar member 38 of each inner shell member 25 respectively to be rotationally movable. Predetermined rotational torque is applied to a support part for the pivot arm 44*c* (44*d*) and the pivot shaft 44*a* (44*b*). In addition, the first pivot arm 44*c* and the second pivot arm 44*d* rotationally move in synchronization with each other. Accordingly, also in such a configuration that the resistance application section 44 is used, it is possible to apply the desirable resistance and tension to the rotational moving operations of each outer shell member 24 and each inner shell member 25. The resistance application section 44 may be also applied to the hinge device 50.

The configuration that one hinge device 14 (50) which extends in the Y direction is used is exemplified as above. However, a configuration that the hinge devices 14 (50) are disposed, for example, on the one-end side and the other-end side with the Y-direction center being interposed as one pair and so forth may be also made.

The configuration that the display 16 is disposed on the inner face 12Ac side of the chassis 12A and the inner face 12Bc side of the chassis 12B which are mutually folded is exemplified as above. However, the display 16 may be also disposed on the outer face side which is located on the crest side when mutually folding the chassis 12A and 12B.

Although the portable information apparatus 10 which is capable of being folded in half just like a book is exemplified as above, the present invention is also applicable to various configurations such as, for example, a swing-open configuration that small-sized chassis members are respectively coupled to left and right edges of a large-sized chassis member to be foldable, an S-shaped folding configuration that chassis members which are different from each other in folding direction are respectively coupled to left and right edges of one chassis member, a J-shaped folding configuration that a small-sized chassis member is coupled to one of left and right edges of a large-sized chassis member to be foldable and so forth in addition to the configuration that the chassis members of the same type are mutually folded in half and the number of the chassis members to be coupled may be four or more.

As has been described, the present invention provides a potable information apparatus having two chassis that are foldable via a hinge device.

While the invention has been particularly shown and described with reference to a preferred embodiment, it will be understood by those skilled in the art that various changes in form and detail may be made therein without departing from the spirit and scope of the invention.

What is claimed is:

1. A portable information apparatus, comprising:
a first chassis having an upper face, a lower face and side faces;
a second chassis having an upper face, a lower face and side faces; and
a hinge device disposed between said mutually adjacent side faces of said first chassis and said second chassis and to couple said first chassis and said second chassis together to be foldable, wherein said hinge device includes
a plurality of outer shell members disposed side-by-side along an arrangement direction of said first chassis and said second chassis, and is respectively equipped with hollow parts that pass through said outer shell members in said arrangement direction,
a plurality of inner shell members each of which is disposed so as to stride over a boundary at least between lower faces of said mutually adjacent outer shell members in said hollow parts of said mutually adjacent outer shell members,
a first coupling section couples each inner shell member and one of said mutually adjacent outer shell members together to be relatively rotatable and relatively movable, and
a second coupling section couples each inner shell member and said other of said mutually adjacent outer shell members together to be relatively rotatable and relatively movable, and couples said first chassis and said second chassis together to be foldable in such a manner that each outer shell member and each inner shell member rotationally move relatively via said first coupling section and said second coupling section and thereby said upper faces of said first chassis and said second chassis mutually face.

2. The portable information apparatus of claim 1, wherein said first coupling section includes a first guide pin and a first guide groove with which said first guide pin engages to be movable and rotatable.

3. The portable information apparatus of claim 2, wherein one of said first guide pin and said first guide groove is disposed on/in each inner shell member and said other of said first guide pin and said first guide groove is disposed on/in one of said mutually adjacent outer shell members.

4. The portable information apparatus of claim 3, wherein said second coupling section includes a second guide pin and a second guide groove with which said second guide pin engages to be movable and rotatable.

5. The portable information apparatus of claim 4, wherein one of said second guide pin and said second guide groove is disposed on/in each inner shell member and said other of said second guide pin and said second guide groove is disposed on/in said other of said mutually adjacent outer shell members.

6. The portable information apparatus of claim 1, wherein said hinge device couples said first chassis and said second chassis together to be foldable from a used form of said portable information apparatus that said upper face of said first chassis and said upper face of said second chassis are almost on said same plane to a housed form of said portable information apparatus that said upper faces of said first chassis and said second chassis mutually face.

7. The portable information apparatus of claim 6, wherein
in said housed form, enters a state where at least end faces on said lower face sides of said mutually adjacent outer shell members are separated from each other to form a gap between said end faces and each inner shell member closes up said gap, and
in said used form, enters a state where said end faces of said mutually adjacent outer shell members abut on each other and each inner shell member is contained in said hollow parts of said mutually outer shell members.

8. The portable information apparatus of claim 1, wherein said hinge device further includes a resistance application section that applies resistance to rotational moving operations of said outer shell members and said inner shell members.

9. The portable information apparatus of claim 8, wherein said resistance application section includes a wire member which extends along said arrangement direction of said outer shell members, is inserted into a through hole which is formed in each outer shell member and a through hole which is formed in each inner shell member alternately and is fixed to said first chassis at one end.

10. The portable information apparatus of claim 9, wherein said resistance application section further includes a wire grip part which is disposed on said second chassis, holds said other end of said wire member slidably via predetermined frictional force and applies frictional resistance to movement of said wire member.

11. The portable information apparatus of claim 1, further comprising a foldable display which is disposed across said upper face of said first chassis and said upper face of said second chassis.

12. The portable information apparatus of claim 11, wherein part of a back face of said display is supported by said upper faces of said outer shell members.

13. The portable information apparatus of claim 11, wherein
each outer shell member has a square tube shape and said first coupling section and said second coupling section are disposed at positions which are close to said upper face side of an inner face which forms said hollow part, and
each inner shell member has a cover plate part which is disposed in said hollow parts of said mutually adjacent outer shell members along said lower face side inner faces and covers said gap in a case where said gap is formed between said mutually adjacent outer shell members, and
an attachment plate part that stands upright from one end of said cover plate part toward said display side and to which said first coupling section and said second coupling section are attached.

14. The portable information apparatus of claim 1, wherein one of said mutually adjacent outer shell members has a projection part which is formed by projecting an upper face side part of an end face thereof toward said other of said mutually adjacent outer shell members.

15. The portable information apparatus of claim 14, wherein said other of said mutually adjacent outer shell members has a reception part which is formed by recessing an end of an upper face thereof on said one outer shell member side and on which said projection part is slidably disposed.

16. The portable information apparatus of claim 15, wherein a sliding face of said projection part which slides along said reception part has an arc shape.

17. The portable information apparatus of claim 16 wherein a face of said reception part along which said sliding face of said projection part slides has an arc shape.

18. The portable information apparatus of claim 15, further comprising:
a foldable display disposed across said upper face of said first chassis and said upper face of said second chassis, wherein
part of a back face of said display is supported by said upper faces of said outer shell members, and
said arc shape of said projection part and said arc shape of said receiving part have centers at positions where said mutually adjacent outer shell members overlap said display.

* * * * *